United States Patent [19]

Gupta et al.

[11] Patent Number: 5,260,868

[45] Date of Patent: Nov. 9, 1993

[54] METHOD FOR CALENDARING FUTURE EVENTS IN REAL-TIME

[75] Inventors: Subhash Gupta; Sanjiv S. Sidhu, both of Dallas; Frank Vlach, Plano, all of Tex.

[73] Assignee: Texas Instruments Incorporate, Dallas, Tex.

[21] Appl. No.: 776,713

[22] Filed: Oct. 15, 1991

Related U.S. Application Data

[60] Continuation of Ser. No. 614,956, Nov. 15, 1990, abandoned, which is a continuation of Ser. No. 408,163, Sep. 15, 1989, abandoned, which is a division of Ser. No. 273,643, Nov. 10, 1988, Pat. No. 4,888,692, which is a continuation of Ser. No. 895,061, Aug. 11, 1986, abandoned.

[51] Int. Cl.⁵ .............................................. G06F 15/20
[52] U.S. Cl. ...................................................... 364/402
[58] Field of Search ............... 364/478, 468, 156, 152, 364/402, 153, 401

[56] References Cited

PUBLICATIONS

Campbell, K. L. "An alternative—Bucketless net change MRP", Proc. 20th Int. Tech. Conf. APICS, Cleveland, Ohio, 1977, 325-333.

Brown, R. "Calendar queues: a fast 0(1) priority queue implementation for the simulation event set problem", Communications of the ACM, vol. 31, No. 10, Oct. 1988, 1220-8.

Primary Examiner—Roy N. Envall, Jr.
Assistant Examiner—X. Chung
Attorney, Agent, or Firm—Frank J. Kowalski; Leo N. Heiting; Richard L. Donaldson

[57] ABSTRACT

A mechanism and method for calendaring a plurality of events such as scheduling the operation of interrelated machines which perform a process flow. Future time is divided into segments, called buckets, of increasing length. The first two buckets are of the same size and each of the following buckets twice as large as its preceding bucket. The first bucket slides so as to always cover a specified length of time following the current time. Events scheduled in the calendar is added to the appropriate bucket, depending on how far in the future it is to take place. When the current time equals the scheduled time for an event, then that event is removed from the bucket where it resides. When a bucket has become empty because all events have been removed from it, the events in the following bucket are distributed over the two buckets preceding it.

14 Claims, 7 Drawing Sheets

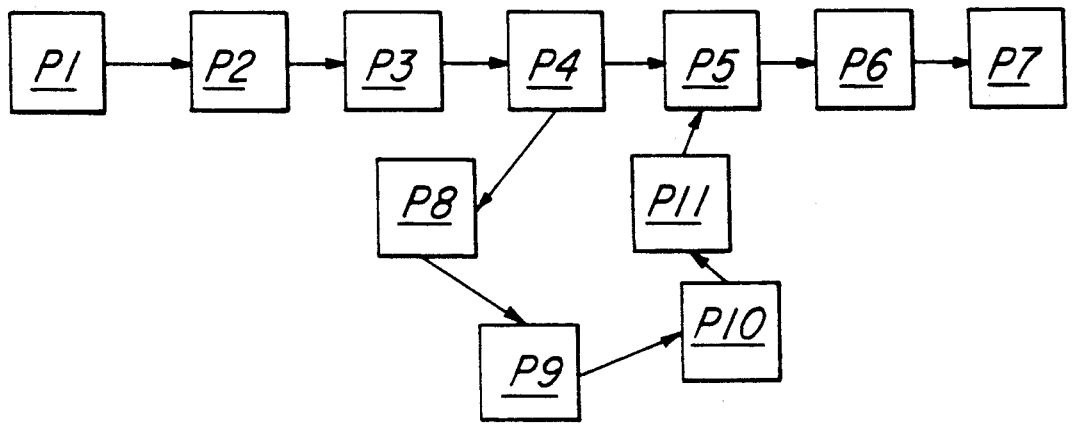

Fig. 1

```
PROCESS

PROCESS-NAME
PROCESS-NUMBER
PRECEDING-PROCESS
NEXT-PROCESS
WHICH-MACHINES
REWORK-POINTER
REWORK-PROCESS
PROCESS-TIME
CONSTRAINT-STARTER
CONSTRAINT-MEMBER
USAGE
QUEUE
```

Fig. 2

```
MACHINE

MACHINE-NUMBER
MACHINE-NAME
MACHINE-TYPE
PROCESSES
CAPACITY
SET-UP-TIME
SCHEDULED-DOWNTIME-FREQUECY
SCHEDULED-DOWNTIME-LENGTH
MTBF
MTTR
MTBA
MTTA
USAGE
AVAILIBILITY
SIDES
LOTS-DONE-ON-CURRENT-PROCESS
LOTS-DONE-ON-CURRENT-SIDE
LAST-LOADED-AT
NEXT-AVAILABLE-AT
NEXT-MAINTENANCE-TIME
DOING
SCHEDULING-TYPE
WAITING-TIME
OPTIMIZING?
CHECKED-UP-TO
```

Fig. 3

|   FROM |     |     |     |          |
|--------|-----|-----|-----|----------|
| M      | P1  | P2  | P3  |          |
| P1     | —   | 20  | 25  | SET UP   |
| P2     | 10  | —   | 15  | TIMES    |
| P3     | 5   | 10  | —   |          |

TO (on left side)

(IN TIME STEPS)

*Fig. 4*

```
SAFE-TIME-CONSTRAINT

BEGINNING-PROCESS
END-PROCESS
PROCESSES
LENGTH
GREATEST-PROCESS-TIME
CONTROLLING-PROCESS
TIME-TO-CONTROLLING-PROCESS
NEXT-AVAILABLE-TIMES
LOT-NUMBERS
OPTIMIZING?
```

*Fig. 5*

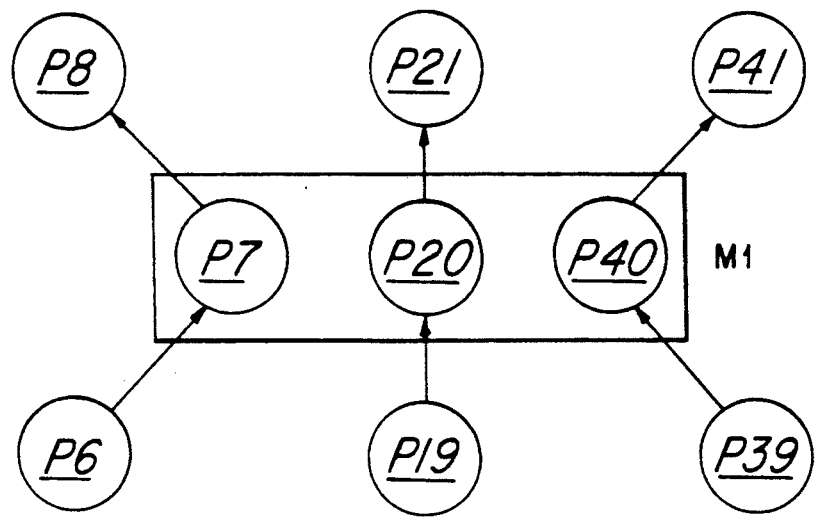
Fig. 12
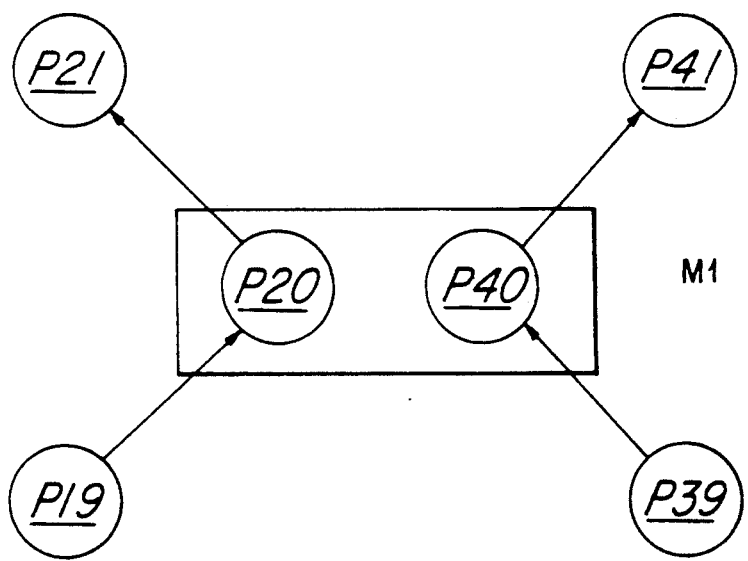
Fig. 13
| TO | FROM M1 | P20 | P80 |
|---|---|---|---|
| | P20 | – | 10 |
| | P40 | 20 | – |
SET UP TIMES
Fig. 14

METHOD FOR CALENDARING FUTURE EVENTS IN REAL-TIME

This application is a continuation of application Ser. No. 07/614,956, filed Nov. 15, 1990 now abandoned, which is a continuation of application Ser. No. 07/408,163, filed Sep. 15, 1989, now abandoned which is a division of application Ser. No. 273,643 filed Nov. 10, 1988, issued as U.S. Pat. No. 4,888,692, which is a continuation of application Ser. No. 895,061 filed Aug. 11, 1986, now abandoned.

Attached as a Microfiche Appendix including 8 fiche and 448 frames, and incorporated by reference hereto, is a listing of LISP code which implements the scheduler (Appendix A), a simulator (Appendix B) and user interfaces (Appendix C).

BACKGROUND AND SUMMARY OF THE INVENTION

The present invention relates to automated scheduling and planning systems.

Resource planning is used extensively by industry. It is especially useful in the manufacturing sector, where careful scheduling of a manufacturing facility is necessary in order for such plants to be efficient. The flow of raw and partially finished goods, and scheduling of work on the various available machines, is a significant problem in large manufacturing facilities. A few examples of manufacturing facilities which are especially sensitive to scheduling problems include semiconductor fabrication facilities (front-ends), job shops, and plants making automobiles and heavy machinery.

The number of details and computations involved in completely scheduling a large manufacturing facility are enormous. No exact mathematical solution can, in general, be generated for such a facility. This is primarily because the facility does not operate in an ideal manner. Unforeseeable events are very common, including machine breakages, bad work which must be reworked or thrown away, and delays in moving material within the facility. These minute by minute events can have an impact on the overall operation of the facility and the precise nature of such impact cannot generally be determined in advance.

Many different schemes are currently in use for scheduling factory systems. These include the simplest scheduling system, that of no preplanned scheduling at all. In some factories, a work piece simply moves from machine to machine under the experienced guidance of the operator, and no particular pre-planning is made. In slightly more sophisticated systems, various rules of thumb are used by operators and process experts to control the flow of material through the plant. Some of these rules are very simple, such as FIFO (first-in-first-out). These rule of thumb decisions are made at a localized level. That is, the operator or expert will decide which workpiece should next go onto a particular machine based on the list of those workpieces currently available for the machine.

A more sophisticated system includes coordinated plant wide planning at some level. This is generally done by globally defining the manufacturing process and studying the interrelation between the various sub-processes therein. Such plant wide planning typically includes the identification of trouble spots such as bottlenecks in the overall process flow. An example of a state-of-the-art system would be OPT (Optimized Production Technology) which has been used for modeling and planning of manufacturing facilities since approximately 1979. The general theory of OPT is that plant capacity is determined by one or a small number of bottleneck processes. The overall strategy is then to ensure that the bottleneck processes are kept constantly busy by ensuring that queues are maintained in front of them. Desired work in process inventory levels at key points throughout the plant are determined at the global planning stage, and these desired values are compared to those which actually occur to determine the operating conditions within the plant.

Current sophisticated scheduling procedures generally begin with the creation of a global plan which outlines the overall characteristics of the manufacturing facility. Based on the current status of the facility, including such information as identification of work in process and machines which are down for repair, a general plan is made for some future time period. This plan will include directives such as "begin work on some number of identified items each hour for the next eight hours." Running a global plan periodically can be referred to as batch processing.

Batch processing of the global plan does not allow quick or easy response to changing conditions. If plant conditions change, such as a major piece of machinery going off-line for repair, the entire global plan must be recalculated. Such global plans do have the advantage that they take into account in the relationship between various parts of the manufacturing process, but they are relatively inflexible and can only be applied to broad concepts. Decision making at the level of a particular machine must still be done using rules of thumb.

Even in sophisticated systems, there is little interaction between the global plan and local decision making processes. The global plan cannot comprehend the effect of breakage of a particular machine in advance. Local decision making, that is, which work to load on which machine and in which order, is generally done by rules of thumb and cannot comprehend the effect of a particular action on overall plant operation. Planning is done only periodically at the global level, and often incorrect or inaccurate rules of thumb constitute the entire decision making process at a local level.

It would be desirable for a scheduling system to comprehend a global planning strategy combined with intelligent local decision making which considers the effect of local decisions elsewhere within the manufacturing process. It would be further desirable that such system be able to react to the numerous uncontrollable events which occur during the manufacturing process.

Therefore, a scheduling system includes a global, steady-state model of the entire manufacturing process. This global calculation is done one time and recalculated only when there is a major change in process flow definition or machine availability. This global plan generates parameters which are used to control local decision making strategies. The local strategies are applied to each machine in the manufacturing facility, and are relatively simple. Based upon the parameters extracted from the global definition, and information regarding the current state of the neighborhood of the particular machine, local decisions can be made on a real time basis. Special decision making strategies may be used by machines which are indentified as critical to the manufacturing process flow.

The novel features which characterize the present invention are defined by the appended claims. The foregoing and other objects and advantages of the present invention will hereafter appear, and for purposed of illustration, but not of limitation, a preferred embodiment is shown in the accompanying drawings.

BRIEF DESCRIPTION OF THE DRAWINGS

FIG. 1 illustrates a sample process flow, including a rework loop;

FIG. 2 illustrates a Process data structure;

FIG. 3 illustrates a Machine data structure;

FIG. 4 is a setup time matrix for a machine having sides;

FIG. 5 is a safe time constraint data structure;

FIG. 12 is a portion of a process flow illustrating a bottleneck machine;

FIG. 13 illustrates a different bottleneck machine situation;

FIG. 14 is a chart of setup times for the process flow of FIG. 13;

DESCRIPTION OF THE PREFERRED EMBODIMENT

Figure 6:
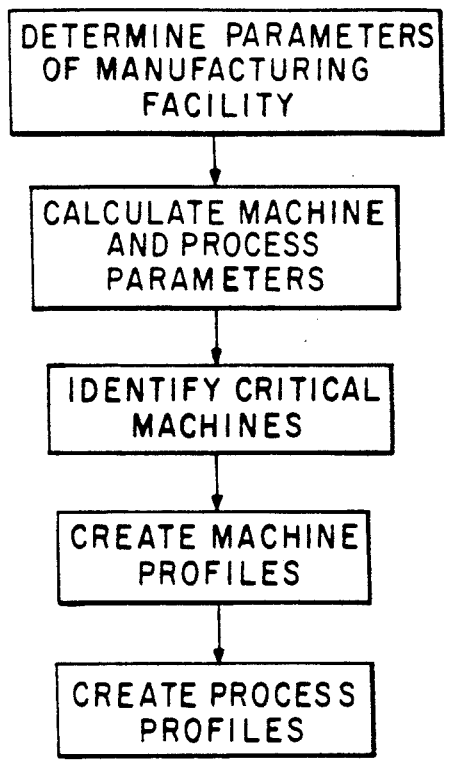
FIG. 6 is a flowchart of a portion of the global planning process.

The following description of the preferred embodiment includes detailed examples as well as the general approaches used in making a scheduling system. The description is broken into 4 major areas: a general description of a factory system, including definitions of terms found elsewhere; the global (steady-state) planning process: local planning and optimization; and a preferred calendar mechanism for use by the scheduler. It is understood that particular references and descriptions are not intended to limit the scope of the claims to the details shown therein, but are for illustrative purposes.

DESCRIPTION OF THE FACTORY SYSTEM

The scheduling system is itself constrained by the nature of the factory to be controlled. It must be able to handle special situations which occur in the factory, such as relationships between certain machines. Many relationships which are found in factories and other systems which can be controlled by a scheduler are similar, and will be the same as those which will now be described.

The preferred scheduling system will be described with relation to a front-end manufacturing facility for integrated circuits. This type of manufacturing facility is sufficiently complex to illustrate many features of the scheduling system. Other types of manufacturing facilities will have different specific machine types and other considerations, but most will be clearly adaptable from the described system.

The scheduling system will be described with respect to a front end which is highly automated, but automation is not a necessary feature for its use. Commands which are made to machines and controllers in the automated system can just as easily be made to human operators running the machines. As will be described most of the control functions will be handled directly by the scheduling system, but it is a straightforward task to have some of these functions handled by the machines themselves if they are capable of doing so.

The period of time which will be used herein is called the time step. A time step is preferably 0.1 hours or 6 minutes. All times used by the scheduler are expressed in time steps, and all absolute times, such as the predicted time for an event, are expressed as a number of time steps from some arbitrary beginning. Thus, clock time is not used, but there is a simple correlation between actual time and time indicated by the time step count.

The procedure by which a semiconductor slice is transformed into integrated circuits can be conceptualized as a series of discrete process steps. These process steps are independent of the machines actually located on the factory floor. These process steps are the functional description of what actually happens to the slices at each stage of manufacture. For example, a short series of process steps might be: apply photoresist, pattern photoresist, develop photoresist, inspect, bake photoresist. These process steps are the atomic elements of the scheduling plan: each is an indivisible action which occurs at a single place and over a fixed, unbroken period of time. A typical front end process will include several hundred such process steps. In addition, multiple process flows may operate in one facility simultaneously, such as when a front end has several product lines. Each product line will have different process steps for each stage of manufacturing. Even though there may be much similarity between two different process flows, for simplicity it is preferable that each step of each process be uniquely identified. The fact that a single machine may perform a similar step for each process flow causes no confusion, as will be explained below.

The process steps can be visualized as a long string of events which operate to transform a bare silicon slice at the first process step to finished integrated circuits at the last process step. As far as a front-end is concerned, the finished product is usually a semiconductor slice having fully formed integrated circuits thereon. The individual circuits are separated and packaged elsewhere.

The string of process steps is not always a single string of events occuring in a fixed order. It is sometimes necessary to rework some slices at various stages of the process. For example, if for some reason a photoresist patterning step did not occur properly, it is necessary to remove all of the resist, clean the slice, reapply photoresist, and redo the patterning step. This is referred to as a rework loop, and, on a schematic diagram of the manufacturing process, appears as a small loop of process steps off to one side of the main process flow. Rework loops are not available for all types of processing; for example, a metal workpiece which has been incorrectly drilled may not be salvagable.

FIG. 1 shows a very short process flow for an imaginary front end. Process steps are identified by P, so the main flow has process steps P1–P7. A single rework loop is shown containing process steps P8–P11.

A process step has several important properties. The most important of these are collected in a process data structure such as shown in FIG. 2. The process must be uniquely identified, preferably by a PROCESS-NAME and PROCESS-NUMBER. The preceding and following processes are identified in PRECEDING-PROCESS and NEXT-PROCESS. A list of machines that perform this process is included. If this process is a rework decision point, that is, a check or inspection process that might cause slices to branch into a rework loop as described above, a pointer to the start of the rework loop is kept. This pointer is nil if the process step is not a rework decision point. If this process is part of a rework sequence, that rework sequence is identified. The other data contained in the structure of FIG. 2 will be described later.

The basic unit of material will be referred to as the lot. In a semiconductor front end, a lot is a group of slices which are processed together. A lot typically consists of 24 slices. Most machines used in the front end operate on some number of lots, which in this case is a multiple of 24. Machine capacity will be referred to by lot size, so that a 4 lot machine can handle 96 slices simultaneously in the present description. Of course, lots may be of other sizes if desired. Also, in many manufacturing facilities, individual items (such as a metal ingot) would be the basic unit of material. The lot is considered to be a single atomic unit, in that operations on partial lots are not allowed.

As stated above, process steps are independent from the actual machines on the factory floor. Several machines are often used for a single process step. These machines may not be identical. Additionally, a single machine could be used for more than one process step. For example, a machine for applying photoresist can be used for any process step that requires application of resist. If a process flow requires 4 applications of resist, and there is only one machine for the job, that machine is actually used in four distinct process steps. A typical application might have 8 identical photoresist application machines, ten normal process steps for applying resist, and ten rework process steps for applying resist. Each process may have access to each machine, so that each process thinks that it has 8 machines to choose from whenever a lot passes through that process. However, there will be contention for the machines by the various processes, so that, on the average, each process has access to each machine for only its proportional share of the time. For example, in the case of 8 machines, 10 process steps, and 10 rework process steps, it may be that a rework sequence needs to be done on the average of 1 time in 10. Every normal process step will have the same utilization because every lot must go through every step, while the rework steps will, on the average, have only one-tenth the utilization of the normal steps.

Each machine also has an associated data structure, such as shown in FIG. 3. This structure includes a unique machine number and name for each machine, and the machine's type and the processes in which it is involved. The capacity of the machine is expressed in number of lots.

The structure for each machine has a pointer labelled SET-UP-TIME, which points to a series of tables, each table corresponding to one machine. When a machine changes over from one process to another, there may be some machine setup which must be done. This setup time will be added to the total job time when it is necessary. The setup time may be different for each pair of processes moved from and to, so a setup time matrix such as that shown in FIG. 4 is used by the scheduler. This matrix is for a machine which does 3 different processes, and shows the setup time to be added to the job time whenever moving from any process to any process. Setup times are shown in time steps as described above.

Each machine also has information showing its scheduled downtime. This includes both the frequency and expected length of such downtimes. Scheduled downtimes are those required for preventive maintenance, plant shutdowns, and other predictable events. Mean time between failure (MTBF) and mean time to repair (MTTR) information is also included. This information helps provide statistical information on the machine's availability. Related to MTBF and MTTR information is mean time between assists (MTBA) and mean time to assist (MTTA). An assist is a very short and simple fix that doesn't qualify as a repair and doesn't require a major recalculation of other machine's operation. An assist would typically be something that could be repaired in less than one time step by a single operator. MTBA and MTTA information is also used for statistical availability calculations.

USAGE for a machine is an indicator of how much of the time a machine actually processes each lots as it goes through the entire process flow, adjusted for availability. A high usage indicates that the machine spends more time processing each lot than machines having low usage. If the manufacturing facility is operating at or near maximum capacity, machines having a high usage will be nearly always busy. Machines having a high usage are referred to as bottlenecks and are treated in more detail in the discussion of global plant optimization. Low usage machines are idle more of the time. Typical manufacturing operations are fairly sparse, that is, a large number of the machines have a moderate to low usage factor. A term related to usage is utilization, which is a percentage indicating how much of the time a machine is actually processing lots. If the facility is operating at or near maximum capacity, machines having the highest usage numbers will also have nearly 100% utilization. If the facility is operating at, for example, 50% of maximum capacity, the bottleneck machines will have a utilization of approximately 50%. The usage number is constant regardless of current plant output.

The AVAILABILITY of a machine is an indication of how much of the time the machine is operational. A machine which breaks down often, or takes a long time to repair, has a low availability factor.

The next item shown in FIG. 3 is the SIDES item. The concept of sides is an illustration of the types of complex interactions which occur between the concepts of processes and the machines which perform them. A side is a grouping of processes on which a machine can operate simultaneously. An example of such a machine is shown in Table 1. The machine in this example can handle 4 lots simultaneously, and is used for (hypothetical) processes 4, 12, 35, 48, and 62. Processes 4, 12, and 62 are short, low temperature bake steps, while steps 35 and 48 are high temperature bakes. Thus, lots from steps 4, 12 and 62 form a side, and steps 35 and 48 form a side.

TABLE 1

| MACHINE M1 | Processes | Description |
| --- | --- | --- |
| | 4 | low temp bake |
| | 12 | low temp bake |
| | 35 | high temp bake |
| | 48 | high temp bake |
| | 62 | low temp bake |

This machine can process any mix of lots from one side at a time. Lots from the two sides cannot be mixed, and there may be a setup time associated with changing from the process of one side to that of the other. This side information allows the machine to operate much more efficiently in many instances, because it need not wait for four lots of a single process to arrive in its input queue before it can process a full load. This has the effect of increasing the percentage of the time that M1 operates full (4 lots), as well as minimizing the average amount of time that lots wait in the queue.

The remaining items in the data structure of FIG. 3 are related to the dynamic operation of the scheduler, rather than the steady-state structure of the machine as do the above described data items. The information concerning lots done on the current process and side are used in the local decision making process, or local optimization, of the machines as will be described under that section. The LAST-LOADED-AT and NEXT-AVAILABLE-AT items are used to determine when the machine will be available to accept the next incoming load. The NEXT-AVAILABLE-AT item also indicates the expected time that a machine will be returned to service if it is currently down for repair or maintenance. The NEXT-MAINTENANCE-TIME item indicates when the machine is next expected to be taken out of service. This refers to scheduled maintenance.

The DOING data item is a list of lot and process pairs, which indicates which lots are currently in the machine, and which processes those lots are involved in. As shown in the discussion on sides, it is not necessary for all lots in the machine to be in the same step of the process flow.

SCHEDULING-TYPE indicates what type of decision making process should be used on this machine whenever a load decision is to be made. Some of the preferred decision types include multi-lot machine optimization, round robin, and constraint member. These decision making processes are discussed under the local optimization topic. WAITING-TIME is a number indicating at which time step the machine should load the next group of lots. During the local optimization process, it is sometimes desirable that a particular machine not load right away, but instead wait for another lot that is expected in the near future. In such cases, WAITING-TIME contains the time at which the machine is next expected to take some action. As far as the scheduler is concerned, the machine will simply sit idle until the current time, as defined by the calendar mechanism, catches up to the value in WAITING-TIME.

The values OPTIMIZING? and CHECKED-UP-TO are used in the local prediction process as described under the subject of local optimization.

Sometimes there will exist a special relationship between groups of processes which requires that successive process steps be performed with very little wait between them. This is especially true in semiconductor processing, wherein lots must be moved quickly from step to step for some span of process steps. If a delay occurs in the middle of this sequence, the semiconductor slices may be ruined. An example of such a series of related process steps could be the several steps involved in applying, patterning and baking photoresist on a slice. Extended interruption of this set of processes could ruin the work in process, requiring that the slices in question be reworked or discarded.

The group of process steps so related is referred to as a time constraint, or simply a constraint. The timing of the steps in the constraint is critical: no large queues must be allowed to build up within the constraint. Once a lot or batch of lots has entered the constraint, they must be moved through to the end with relatively little interruption. Process steps which are contained within such a constraint are referred to as constraint members, and the first step of the constraint is the constraint starter. Membership in a constraint, or being a constraint starter, is indicated in the process data structure (FIG. 2).

The timing of the constraint is controlled by its slowest members. For example, if one constraint member is a process that is one lot wide and take 10 time steps to complete, and there is only one machine to do that process, only one lot can pass through the constraint every 10 time steps regardless of the speed and capacity of the remaining members. Thus, when load decisions are made for the process starter, it is necessary to know the characteristics of all processes in the constraint.

A separate data structure is kept for each constraint. Such a structure is shown in FIG. 5. This structure indicates the beginning and end processes, lists the actual processes by number, and gives the total processing time of the constraint. The longest process time of any process in the constraint is given in GREATEST-PROCESS-TIME, and the first process having that process time is considered to be the controlling process. TIME-TO-CONTROLLING-PROCESS is the number of time steps from the constraint starter, including the process time of the constraint starter, until a lot or group of lots is available for loading into the controlling process. If the next available time for the controlling process is known, TIME-TO-CONTROLLING-PROCESS determines when the next batch of lots can be started into the constraint. Also included in the structure are the lot numbers currently within the constraint, and a flag to indicate whether this constraint is currently included in a local optimization process.

In the embodiment of the scheduler which is described herein, delays which occur between unloading a machine and making a lot available to the next process are not considered. Such delays are usually small compared to the overall operation of the facility, and are not generally important. However, in cases where delays are significant, it may be necessary to take them into account. In such a situation, the transfer time is considered to be simply another process step, and is treated as are all other process steps. Thus, the overall scheduling system need not be modified to take such delays into account; they are handled within the parameters of the system as is currently described.

GLOBAL PLANNING

Before actual scheduling of the processing facility is undertaken, a global analysis of the facility must be made. The results of the global analysis are made available to the local decision making portion of the scheduler to improve its optimization functions. The global analysis is preferably made only one time unless process parameters change significantly or process flows are changed.

The purpose of the global planning stage is to define the steady-state features of the manufacturing facility. This includes defining process flows and statistics of the various process steps. Special features of various machines are taken into account, such as machines which have a high usage or long process times. Special processing conditions are considered in terms of their impact on the overall plant operation. The results of the global planning step indicate the macroscopic operation of the facility, giving such information as the cycle time and plant capacity. The general strategy by which the plant will be operated is also determined during this planning step. Such general strategies can be, for example: maximizing plant capacity, minimizing cycle time, minimizing labor or manufacturing costs, or maximizing product yield (which may be higher for less than maximum plant capacity).

The general approach of the global planning step which will now be described will attemp to maximize plant capacity while minimizing average cycle time. These two goals are not always consistant, so that some lengthening of cycle time amy need to be suffered in order to give acceptable plant capacities. In semiconductor front-ends, minimizing cycle times tends to improve overall yield, because lots that remain in partially completed states in the facility are especially susceptible to damage.

In order to maximize plant capacity, it is necessary that high usage machines be utilized nearly 100% of the time. These bottleneck machines are identified during the global planning process, and the throughput of the plant is adjusted so that the machine or machines having the highest usage number have a utilization just under 100%.

Queueing theory demonstrates that a machine which has a maximum processing rate equal to the average arrival rate of work for that machine will eventually build an infinite queue (large in practical terms) in front of it unless the incoming work arrives in precisely regular fashion and the machine never breaks down. If the machine does break down, a common occurance in many industries, or the arrival of incoming material is not completely regular, which is the rule rather than the exception, the machine can never deplete its input queue. Since queues build up, cycle times of products increase and the amount of work in process increases.

The preferred embodiment therefor keeps the bottleneck machines occupied several percent less than their entire available time so that long queues do not build up in front of them. In some cases, 2-3% planned slack time would be sufficient, while in others 10% or even 20% may be necessary. The amount of slack time which is necessary depends on the expected statistical fluctuations in the arrival rates of lots to the bottleneck machines. Larger flucations require more slack time, while a more uniform arrival rate allows less slack time to be reserved. In addition, the available time for a machine is defined to include time off for expected repairs and maintenance. This means that the planned slack time is not unexpectedly taken away.

The global planning stage is not necessarily done with a computer, although use of a programmed general purpose digital computer will greatly speed up some phases of the process. The global planning stage can be entirely automated, with human input used only to enter data on plant operation and machine parameters.

The general global planning steps are shown in FIG. 6. The order in which these steps are done is generally not important, and in fact several will often be done concurrently, and alternating in iterative steps.

Figure 7:
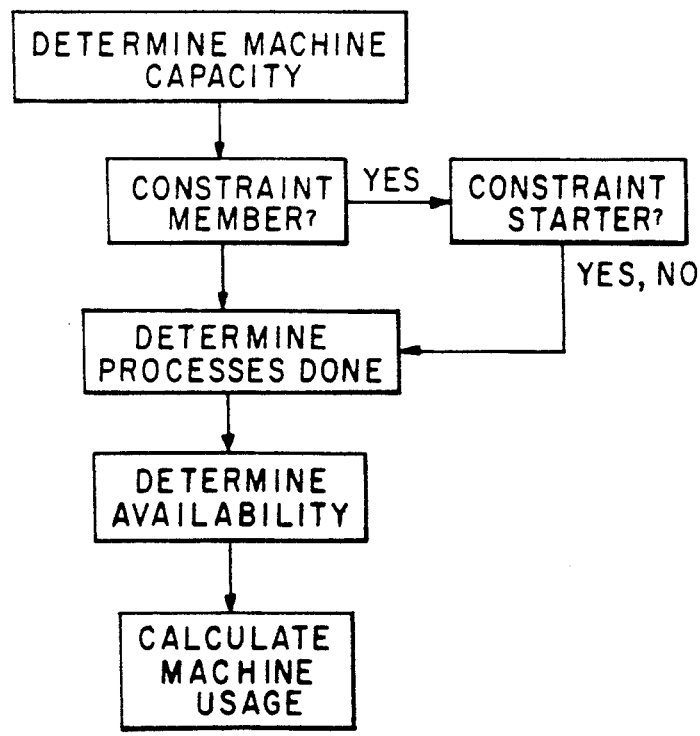
FIG. 7 is a flowchart illustrating another portion of the global planning process.

The first major step is to determine the parameters of the manufacturing facility. These include the definition of the process flows, and identification of machines and determination of their individual characteristics. Calculations are made of the relationship of the various parameters to the overall process flow. These calculations include those items shown in FIG. 7 for each machine.

One of the important process parameters to discover is the usage of each machine. As described above, this is a number representing how much time each machine spends operating on each lot which flows through the plant. For example, if a single machine is available to work on 4 different processes, every lot will pass through that machine 4 times. The process times of the 4 different processess must be totalled, and any setup times must be added, to determine how much time that machine spends on each lot which flows through the plant. This calculation will usually reveal that one or a small number of machines have a very high usage compared to the rest; these are the bottleneck machines. These machines are the ones which control the overall capacity of the plant.

The local optimization process for the bottleneck machines may need to be different from that of other machines. Bottleneck machines must be utilized to the full needed extent, or the overall plant capacity will suffer. The local optimization process takes into account the critical nature of bottleneck machines when making local planning decisions. Not all bottleneck machines will have the same usage, and the degree of criticality depends on the usage number. One result of the global planning process is to give each machine in the plant a usage number which indicates how much time each lot spends with that machine. This number is stored in the data structure for the machine, and is considered to be part of that machine's profile. The complete profile includes other data as will now be described.

Another important parameter is the machine capacity. If a machine can handle many lots at one time, it may have more impact on the overall process flow than one which handles a smaller number. The machine capacity is part of its profile. Large capacity machines which also have long processes have a large impact on the average cycle time in the plant, and are critical machines.

For steady-state statistical purposes, a machine with an actual capacity of two or more lots may have an effective capacity less than its actual capacity. This will be controlled in part by the expected distribution of arrival times of lots into the queue for that machine. For example, if lots tend to arrive in widely separated pairs, a machine which has an actual capacity of 4 lots may effectively only process 2 lots at a time. If this is the case, the global effect of the machine will not be that of one having a capacity of four lots, but rather as that of a machine having less. The effective capacity of the machine could be a fractional number, such as 3.2 lots, which indicates the average number of lots processed for each run of that machine.

Membership in a constraint is an important parameter of all machines which are constraint members. Machines in constraints must take such membership into account whenever local decisions are being made. Any machine which is the constraint starter is also flagged during the global planning stage, as this machine is the gateway into the constraint. The constraint starter determines the flow of lots through the constraint, and as such must be considered a critical machine, at least locally. Constraint membership and starting information is included in the machine profile.

Another important factor in a machine's profile is a list of the processes done by that machine. Machines which do several processes may turn out to be bottlenecks, or may be long queue wait machines if substantial process change penalties exist. An indication of the processes done by a machine is part of its profile.

A portion of this factor relates to contention between process done on a single machine. Any given machine that works on multiple processes may not spend equal time on each of those processes. For example, a machine that does processes P1. P2 and P3 may do 100% of the work on P1 (it is the only machine doing process P1), 20% of the total work done on process P2 (other machines do the rest), and 50% of the work on process P3 (splitting time equally with another machine). This machine should therefor spend different amounts of time processing lots for the different processes. The various attributes of the machine, such as availability, are considered to be distributed among the processes it works on in ratios proportionate to the amount of time spent on each of those processes. A list indicating which processes are done by each machine should also indicate the relative contention factors just described.

Another important part of a machine's profile is its overall availability. This indicates what percentage of the time a machine is actually operational and available to process material, as opposed to being down for repair or maintenance. Machines which are often down can adversely effect overall operation of the plant. Information on the mean time between failures, mean time to repair, peventive maintenance schedules, etc. is used to statistically calculate the amount of time each machine can be expected to be available for use.

Other factors can be included in the profile as appropriate. Number of operators needed to run, quality information, and the like can all be included to indicate how each machine relates to the rest and to the overall process flow.

Many of the above factors must actually be considered in calculating the usage number for each machine. Machine downtime, setup times, effective capacities, and membership in constraints all have an effect on the usage of a machine. For example, a machine having an actual capacity of 4 lots but an effective capacity of 2 lots would have a usage number which is, other factors being equal, twice that which would be calculated without modifications. In this example, the machine would have a usage of one-half the process period per lot instead of one-fourth.

The machine profile for any machine, then, gives a shorthand indication of the importance of that machine to overall plant operation. Certain machines can be considered to be critical; these include machines which have the highest usage because they are the bottleneck machines controlling plant capacity. Machines having long queue wait times, either because the machines have long processes or long setup times, are critical because they influence the average cycle time. Machines which break often can also be expected to build up queues. All machines involved in time constraints have a large local effect, and should be considered critical.

After critical machines are found by creating the machine profiles (FIG. 6), process profiles are also created. These contain the information about processes, which can, to a certain extent, be considered separately from the machines which perform those processes. Local scheduling decisions are made by considering the combination of machine and process profiles, along with other information which will be described in connection with local planning.

At this point, much steady-state information is available about the manufacturing facility. Capacity, cycle time, and expected work in process numbers can be calculated. The various machine profiles indicate the relationship of each machine to the whole. However, detailed scheduling cannot be done from the information available at this stage.

Plant capacity is easily calculated by pinpointing the one machine or process which has the highest usage. This machine is the limiting factor for the plant. The total time which each lot must spend at that machine is equal to the maximum plant capacity in terms of spacing between product units. For example, if the bottleneck machine spends 1 hour processing every lot, is always available and has a capacity of one lot, the maximum plant capacity is 1 lot per hour. If the bottleneck machine can process 4 lots at a time, the maximum capacity is 4 lots per hour.

Minimum cycle time is also very easily calculated. Simply totalling the process times for each process step gives the minimum possible cycle time. Totalling the process times for each process step including average queue wait times gives the average expected cycle time.

The long term statistical behavior of the various machines is calculated to determine the detailed steady state operation of the facility. Extra emphasis is given to those machines which are shown to be critical. One type of critical machine is the bottleneck. Bottlenecks which do not have setup times involved are fairly straightforward to calculate. However, those which have setup times to switch between processes must be handled a little differently.

The first step is to calculate the contention numbers for the machine without considering the setup times involved in switching between processes. This gives a usage value for the machine which is lower than the actual usage. For those machines which have a relatively high usage, the setup times are then factored in. Machines having a low usage need not be treated further, because an error of a few percent in their operation will not noticebly effect the operation of the plant. Then, the effect of various strategies are considered for the bottleneck machines with the setup times included. For example, requiring a different number of loads before making a change will effect the usage; changing over less often will decrease the amount of time spent doing setups. On the other hand, changing over less often will increase the amount of time the machine waits idle while a large queue builds up for the other process. An example process involved in such a bottleneck calculation is shown in FIG. 13 and FIG. 14.

A cost function for the bottleneck machine is devised. This can maximize capacity, minimize cycle time, minimize cost, strike a balance, or achieve whatever global goal is desired. Then the arrival rate of lots at the bottleneck machine is modelled as a distribution, and the cost function is calculated for different loading strategies. The minimum or maximum point of the cost function, as appropriate, determines the optimum loading strategy for that bottleneck machine. These detailed calculations are carried out, preferably, only for the critical machines.

Much of the information needed to rigorously model the critical machines may not be known or easily available. Often, it is not known in advance which machines will be critical. The method outlined above allows the persons designing the scheduler to make a first approximation based on very rough data. Based on these approximations, a few machines and processes will be identified as potentially critical, and the major part or the data gathering effort can be concentrated on these machines. The scheduler described herein is based, in part, on the fact that only critical machines need complete information; less critical machines need not be as carefully modelled because their impact on overall plant operation will be relatively small.

Based on the usage factor for each machine, and given an approximate distribution of lot arrival times, the proportion of the time in which a machine will be required to make a loading decision can be calculated. Many machines, although decisions can be made for them, will be found to have an actual decision to make only a very small part of the time. In other words, a machine having queues for several processes may be so lightly loaded that having lots arrive in two queues at the same time, thus requiring a decision, will be a rare event. These machines need not be burdened with a complicated decision making process. One of the benefits of the present approach to scheduling is that resources are directed to the critical machines, and it is recognized that the short term happenings at most machines, other than fluctuations caused by machine breakage, simply do not matter to the overall operation of the plant.

The proper selection of desired global operating parameters depends on which goals are most important. If the overriding concern is maximizing plant capacity, bottleneck machines will be operated at nearly 100% utilization. If minimizing cycle time is more important, plant capacity will be lowered until acceptable average cycle times are obtained. If other concerns are overriding, such as minimizing operating or labor costs, plant loading will be adjusted to allow these goals to be realized. A mathematical function is generated for each machine in the plant which incorporates the relevent factors, and global plans are made to minimize or maximize that function, whichever is appropriate.

The information from the global planning stage is used to control the local decision making process. Each machine has a profile which indicates its place in the overall scheme; it will then take real time local knowledge and combine it with this information to do local planning, as will be described below.

LOCAL OPTIMIZATION

The real-time portion of the scheduling system depends on local optimization to function efficiently. Instead of recalculating the complete global state for the system each time a decision must be made only the relevant local state is recalculated. This greatly decreases the processor load.

Once the global system parameters have been determined, each machine has several data structures which determine its behavior during operation of the manufacturing facility. These data structures act as a set of guideline instructions which tell each machine what to do next. Decision-making is event driven, and a determination of what comes next for each machine is made whenever certain events take place. Events which drive the decision making process include machine loads and unloads, and a machine going off-line or coming on-line. Whenever one of these events occurs, the scheduling system must calculate what that machine will do next.

The range of actions which can be taken is fairly limited. A given machine may need to load a lot immediately, and the lot may need to be taken from one of several input queues. A machine which processes multiple lots may be required to wait for a full load, or proceed with a partial load.

The computational resources required for decision making tend to grow at least geometrically, and usually exponentially, with the size of the problem. Decisions which consider many factors, such as those made for the entire facility at once, tend to require prohibitive computational resources. However, a larger number of simpler decisions requires a level of resources which is available with currently available computer systems. In the preferred embodiment, a single processing system runs the entire scheduling system. Since decisions are made on a local basis, a single moderately powerful processor can easily handle all the computational demands of a large, complex manufacturing facility.

Even if the computational resources of the processor were strained by operation of the scheduling system on a real-time basis, the system can make allowances for expected demand without severe degradation of the system performance. As shown in FIG. 3, each machine data structure has data items indicating when that machine will next unload, or when it is next expected to load after a waiting period. The scheduler makes decisions when machines are due to load, or when they unload. Since the scheduler knows in advance when its computational resources will be in demand, it is in a position to look ahead and predict when its resources will be inadequate to fully compute each required decision.

Using statistics regarding average decision making time, or rule of thumb formulas which can be built into the system, the scheduling system knows how long it will take to make decisions for each machine. If a heavy demand on computational resources will be required at some time in the future, the scheduling system will need to begin making decisions ahead of time. For example, if the decision making process for an average machine is 30 seconds, and 12 machines are due to be unloaded at the same time step, an instantaneous demand of 6 minutes of computation will be required at that time. If this delay is unacceptable, it will be necessary for the scheduling system to begin the decision making calculations 6 minutes in advance. The results are stored in any convenient temporary location, and used when the machines unload as if the calculation had been made at that time.

If scheduler resources are very tight, such as a very large facility using a small computer system for schedule planning, it is possible that the scheduler will not have time to run a complete calculation for every machine each time a decision is to be made. In such instances, more critical machines, such as bottlenecks, long wait machines, and constraint members will have first call on the computational resources. Less critical machines will receive less or no processor resources when a decision is to be made. Instead, simpler decision strategies can be employed, or even a default strategy, such as load in round-robin mode, are employed. As described above, less than optimal decision strategies are not troublesome for non-critical machines. Thus, the limited processor resources are allocated first to the decisions that have the most impact on overall plant operation.

The type of decision making process used can vary for different process steps. Some processes need very little or no decision calculations. An example of such a process would be one that had a single machine to do that process, and that machine did no other processes. The process has only a one lot capacity. In such a situation, no decisions need to be made; when a lot or batch of lots arrives in the queue to that process step, they are simply processed as available.

A machine which operates on two or more processes will sometimes have a decision to make. These decisions and those which will now be described are based on the state of the neighborhood of the machine under consideration only, not on the entire state of the processing facility. A multiprocess machine should attempt to balance the number of lots from each process which are operated on. A simple strategy for this balancing is a round-robin strategy, where the machine processes one lot (assuming a one lot capacity) from each process which has a lot in the queue before processing a second lot for a process. The weighting of the round-robin strategy varies if the machine is subject to contention from different processes. In such case, the selection of the next lot is done on a basis proportional to the percentage of each process which that machine does. Such a simple strategy is adequate for machines which have a low usage factor and relatively short setup times, and are not closely upstream in the process flow from a critical machine. The effect of critical machines on the operation of machines which must make a decision will be explained below.

Multiprocess machines which have sides and/or long setup times have additional considerations. Grouping work on processes on a side can result in better utilization of any given machine. Long setup time machines must balance the inefficiency of switching between processes and incurring the additional setup time penalty with the potential adverse effect on average cycle time caused by having lots wait longer in the queue. As described in the global planning section, cycle time is controlled by the amount of time lots spend waiting in queues, so, on the average, leaving lots in queues will increase cycle time. This consideration will be much less important if a particular machine is a low usage machine, because the short extra time spent waiting in this queue will usually result in a correspondingly shorter time spent waiting in another queue downstream. If the long setup time machine has a fairly high usage factor, however, it can have a significant effect on the average cycle time for the entire facility. Thus, the decision of whether to undergo a setup procedure at any given time becomes much more important, and additional computational resources must be reserved to make decisions for that machine.

Machines which have a large capacity and a long process time are often faced with a similar decision, even if the machine does not operate on multiple processes. For example, a machine may have a capacity of 4 lots and a process time of 20 time steps. When the machine unloads, only 2 lots are in the queue. The decision to be made is whether to load those 2 lots now, or to wait some short period of time until 1 or 2 more lots arrive so that a larger load can be processed. This decision becomes more complex for a multiprocess machine, especially one with sides.

Bottleneck machines control the maximum capacity of the facility as described in the global planning section. Often there is a single bottleneck machine or group of machines which sets the absolute limit on capacity. This machine is often a multiprocess machine. It is important that this machine be kept operating at a very high utilization, or the capacity of the plant will be reduced below its maximum. If lots are waiting in the queues, a simple round robin decision will usually suffice. However, as explained in the global planning section, it is undesirable to have queues build up in front of bottleneck machines. Instead, it is important to have lots available just as they are needed by the bottleneck machine. This means that the bottleneck machine will need to look ahead, and perhaps exercise control over processes upstream from itself. This look ahead planning for bottleneck machines is critical to overall plant operation, and should receive a large share of computational resources if these are limited.

A process which has multiple machines to execute it will require some decision making at load time, but the problems are generally far simpler than some of those just mentioned. It may be common for a multimachine process to utilize multiprocess machines, however, so the considerations just mentioned will come into account. Machines which do not work equally for all of the processes, described above as contention, will make weighted decisions which tend to prefer processes for which they have the most responsibility. Thus, a machine may spend two-thirds of its time on one process, and the remaining third on another.

Broken machines will tend to develop large queues until they are fixed, even if the average usage is low. It is somewhat inefficient for the processes preceding the broken machine to keep feeding lots into the queue if the machines used for those processes could be utilized for other processes. Thus, a broken machine or perhaps even one which has developed a large queue through natural fluctuations in the flow of material through the facility, can send a negative demand, or lack of demand, signal to the upstream processes. This signal will tend to cause the upstream multiprocess machines to prefer processes which lead elsewhere than to the broken machine. This alleviates somewhat the build up of queues in the facility, with the corresponding increase in average cycle time.

For discussion of the preferred embodiment four local machine scheduling decision types will be used. These are: round robin, multi-lot machine optimization, bottleneck, and constraint member. Round robin is a simple strategy and has been discussed. It simply causes the particular machine to evenly rotate its selection of incoming process queues when there is a choice.

Bottleneck strategies are used for machines which have been identified as bottlenecks by their high usage factors. The precise nature of the bottleneck strategy depends on other features of the bottleneck machine, such as whether it has sides or long setup times.

Multi-lot machine optimization strategies are done by machines which are large wait machines. As described above, these are those which have multiple processes and relatively long setup times for process changes, and machines which have multiple lot capacity and long process times, regardless of the number of processes done by that machine. Long setup time machines must decide whether to make another run without changing processes, and whether to wait for more lots to arrive if the machine has a multiple lot capacity. Long process time machines must decide whether to wait for a larger or full load, or to go ahead and process a partial load. Since the process time is relatively long, having lots arrive in the queue soon after a partial load has been started can have an adverse impact on the average cycle time. An example of this decision process is explained in connection with FIG. 8.

The general strategy for a constraint member is to satisfy the requirements of the time constraint. This involves looking at the other processes in the constraint before making a decision. Constraint starters do much of the decision making for the constraint, but individual machines may be multiprocess machines. This means that they will have to juggle the requirements of the constraint with the requirements of other processes. It should be obvious that the requirements of a constraint will take precedence over other work for a particular machine.

The actual decisions to be made by each machine, and the type of decision process which they will use, are of course extremely dependent upon the particular configuration of the manufacturing facility. However, the general problems are quite common, and examples of decision making strategies at work on the local level will now be given with respect to FIG. 8 through 15.

Figure 9:
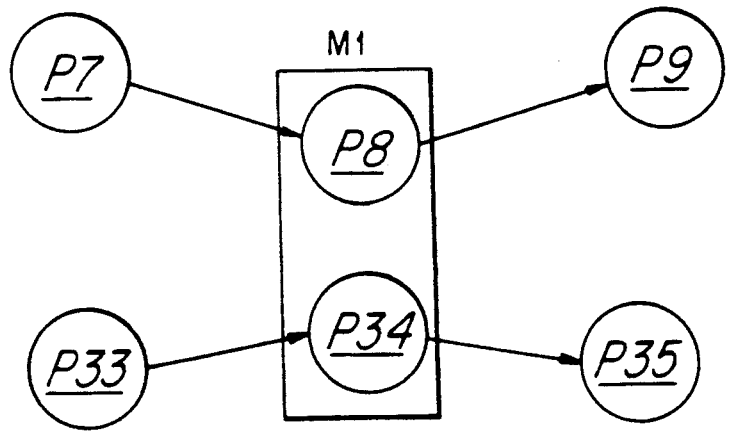
FIG. 9 illustrates a portion of a process flow for a multiple process machine.

FIG. 9 illustrates the operation and decision making of a single machine which operates on two processes. There are no other machines which operate on either process. M1 is assumed to have a capacity of 1 lot. The two processes done by machine M1 are P8 and P34. The preceding processes are P7 and P33, and the following processes are P9 and P35. The processes P8 and P34 must share M1, but their operation is not affected by this.

Whenever lots enter a queue, they are actually placed in the physical queue for a particular machine, in this case M1. However, the process data structure and the lot data structure both indicate which process the lot is waiting for. The separation between the physical position and the logical position of the lot, in terms of which logical process it is undergoing, therefor remains clear. Thus, M1 sees that a lot has entered its physical queue, and it is appropriately placed into its logical queue by the information in the lot and process data structures.

Assuming M1 is a low usage machine, and its decision making is not affected by downstream bottleneck or long wait machines, its decision strategy will be a simple round robin strategy. If there are lots in only one process queue, M1 will process the lot with the longest wait time as soon as any work in progress is unloaded from the machine. If there are lots in both process queues, M1 will select the oldest lot from the opposite queue than the previous lot. Thus, selection of the process queues will alternate, with the oldest lots for each process being selected. Processes P8 and P34 will be done equally over the long run. Of course, due to factory dynamics, is likely that batches of lots will come from P7 and P33 at different times. For a relatively low usage M1, having no setup times associated with changing processes, the simple round robin strategy is adequate.

Figures 10, 11:
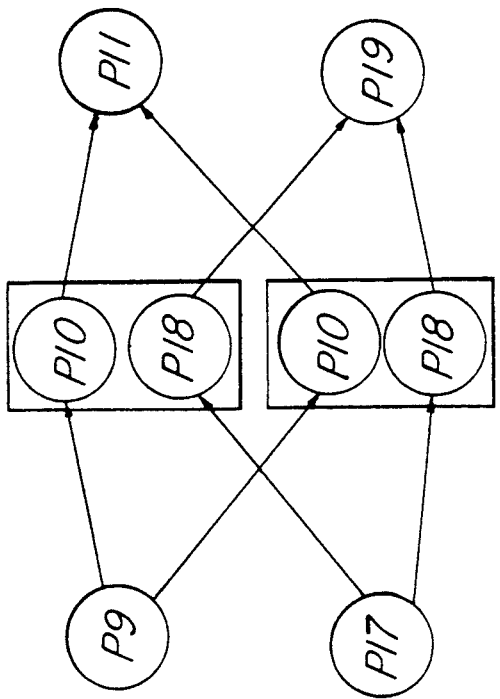
FIG. 10 illustrates a portion of a process flow for multiple process machines operating on multiple machine processes.
FIG. 11 is a timing diagram for the process flow of FIG. 10.

A decision process for two machines doing the same multiple processes is shown in FIG. 10. The machines M1 and M2 are defined as set forth in Table 2, and are identical. M1 and M2 have equal contention for both processes; that is, M1 and M2 are equally responsible for P10 and P18.

TABLE 2

| Machine | Processes | Capacity | Process Time |
|---|---|---|---|
| M1 | P10, P18 | 1 lot | 4 time steps |
| M2 | P10, P18 | 1 lot | 4 time steps |

Any lots in the queue coming from P9 and P17 are equally accessible by either machine. That is, lots in a process queue are not assigned to a machine until that machine loads a lot. M1 and M2 both use a simple round robin strategy, and are initially unloaded. FIG. 11 shows arrival times of lots from P9 and P17, and the number of lots which arrive. These are labelled as arriving in the process queue for processes P10 and P18. FIG. 11 also shows load and unload times for M1 and M2, and which logical process it is undertaking, where L indicates a load. U indicates an unload, and neither indicates processing only. Note that the capacity of P9 is 4 lots, while that of P17 is 2 lots, although either may complete a partial load.

Lots arrive in the queue for P10 at times 1, 8, and 19. Lots arrive in the queue for P18 at times 4, 8, and 18. As shown in FIG. 11. M1 and M2 alternate which process they do if there is a lot available in the alternate queue. If not, such as at time step 6 for M2, the machines will process the oldest available lot in any available queue.

FIG. 12 illustrates a bottleneck machine which does 3 processes. The machine M1 has a capacity of 1 lot and a process time of 1 time step. It is the only machine available to work on any of processes P7, P20, and P40. This machine uses the bottleneck strategy for decision making.

Every lot which is produced by the facility must go through M1 exactly 3 times, assuming no rework loops are involved. Thus, in the long run, it is essential that M1 operate on processes P7, P20, and P40 equally. Otherwise, queues will build up somewhere in the process flow. In the simple case, there are no setup times involved in changing between processes. Since the contention for M1 by each of processes P7, P20 and P40 is equal, a straight round robin approach ensures that equal time is spent working on each process. Since M1 is a bottleneck machine, it will be kept almost constantly busy. Queues will tend to build up in front of M1, and they are handled in the straightforward manner just described.

If M1 is not equally responsible for each of processes P7, P20 and P40, the round robin selection will be modified by the relative responsibility M1 has for the three process. For example, if M1 is soley responsible for P7, and responsible for 50% of P20 and P40, M1 will spend one-half of its time on P7, and one-fourth on each of P20 and P40. If queues exist for all three processes, M1 will typically do 2 lots for P7, followed by one each for P20 and P40.

A more difficult, and perhaps more common, situation for bottleneck machines occurs when there is a setup time incurred when changing from one process to another. Such an example is shown in FIGS. 13 and 14, which depict a bottleneck machine M1 having 100% responsibility for both P20 and P40. Capacity of M1 is 2 lots, and process time exclusive of setup is 10 steps. As shown in FIG. 14, it takes 20 time steps to setup for process P40 after running P20, and 10 time steps for the reverse setup. If the process done were alternated after every lot, the actual effective process time for P20 would be 10 time steps, and the effective process time for P40 would be 40 time steps. As described for this example in the global section, an optimum strategy is calculated for the number of lots to process before switching processes. As an example, the optimum point for FIG. 13 might be to process 4 loads (8 lots) before changing processes.

With the long setup times involved in this example, there will nearly always be lots waiting in one or both queues. If the setup times were relatively short, this would not necessarily be the case. If, through machine breakages or unusual natural fluctuations, there are many lots waiting in both queues, the decision making process is very simple. M1 simply follows the already determined optimum plan of doing 4 full loads before switching processes. In many cases, however, the queues will be short enough that the queue for the current process will empty before 4 loads are processed. In this case, an example would be a queue which had only 6 lots, with no additional lots expected for 50 time steps.

If global goals dictate that the bottleneck machine must be utilized nearly 100% of the time, it is necessary that the optimum loading scheme be adhered to as closely as possible. Therefor, the bottleneck machine M1 must be able to exercise some degree of control over the processes which feed it. This is done through the use of demand signals generated by M1.

When M1 loads or comes back on line after a repair a decision must be made about loading. Assuming that 4 loads of P40 have just been completed. M1 will prepare to process 4 loads for P20. At this time a local prediction, described in more detail below is made and the arrival times of lots in the queue for P20 is determined. Assume that the queues for M1 are as shown in Table 3.

TABLE 3

| Process | Queue Length |
|---------|--------------|
| P20 | 5 lots |
| P40 | 2 lots |

Assume further that the local prediction shows that the arrival time for the next lots into the queue for P20 is 45 time steps from now at which time 4 lots will arrive. It is easily seen that, including set up time two complete loads will be finished in 30 time steps, and a partial load could be finished within 40 time steps. Waiting for the additional lots to arrive will adversely impact the capacity of the plant. If possible, it is necessary to advance processing of the lots for P20 so that they will arrive by time 30 (from the current time). M1 accomplishes this by sending a demand signal to its upstream process. P19.

This demand signal takes the form of a time by which P19 should load lots if possible. In the current example if P19 had a capacity of 4 lots and a process time of 20 it should load at least 3 lots by 10 time steps from now. This number is placed in P19. When P19 next makes a loading decision, it will comply with the demand if it can do so.

The local prediction can then be run again with the demand signal. If P19 is able to supply the necessary lots in time, M1 will process 4 loads for P20 in the optimum manner. If local prediction shows that P19 will not be able to supply the lots in time M1 must make a decision as to whether to continue processing lots for P40 or process a few lots for P20, and then switch back. The decision is made by calculating the function which states the global goals of the plant. If capacity must be maximized, the decision may be different than if cycle time must be minimized. In the present example, a typical result would be to process one more load for P40, then switch and process 4 loads for P20. Since more lots will be arriving soon for P20, the amount of overall delay will be minimized.

The demand signal sent by M1 will propagate upstream beyond P19 if necessary and possible. For example, whether or not P19 can supply lots to P20 in time may depend on whether P18 makes a certain decision right now. If P18 uses a multiple process machine, its current strategy may be to do other processes for the next few time steps. If P19 cannot satisfy P20 out of its current queue, it will send P18 a demand signal that it needs lots in time to begin processing them within 10 time steps. If P18 can supply the lots in time, it will override its normal strategy and do so. This propagation of demand signal is used when the local prediction is made.

Local prediction is a fairly simple, but extremely powerful. concept. Each machine looks at its short term future, and decides what will happen based on incoming lots and its own decision process. A machine actually runs a simulation based on its current state by asking the immediately preceding processes when it will deliver lots to the current process, and applying its normal decision making processes to that information. When a machine must undertake local optimization, it runs a local simulation to determine what the future will bring.

Local prediction is always done with respect to some definite future time, usually no more than a few tens of time steps away. It simply consists of asking the upstream processes what they will be doing in that time frame, and applying the decision making process to the results. Processes that have machine which are multi-process machines must look at the future plans of all relavent upstream processes. If the current process is the recipient of a demand signal, or a request or negative-request signal (both described below), and any demands imposed by these signals are not met, they must be passed upstream, and the prediction process repeated.

The local prediction process is preferably done for all machines that need it during a single time step. For any given time step, typically several different machines in the plant will need local predictions made for the local optimization process. Intermediate predictions made for one machine are stored temporarily, as they may be used in the prediction process for other machines.

The local prediction process results in different parts of the facility being predicted to different times, so that different processes "exist" at different times. For example, consider the processes outlined in Table 4.

TABLE 4

| Process | Process Time | Predicted Until |
|---------|--------------|-----------------|
| P13 | 10 | 40 |
| P12 | 5 | 35 |
| P11 | 20 | 25 |
| P10 | 30 | 0 |
| P40 | 20 | 40 |
| P39 | 15 | 25 |
| P38 | 20 | 25 |
| P37 | 5 | 20 |
| P36 | 30 | 0 |

Processes P13 and P40 are to make local optimization decisions during the current time step. P13 is to predict 40 time steps into the future, and P40 is to predict 30 steps. P13 predicts that it will process the 2 lots in its queue by time 10. To determine what will come into P13's queue, it is necessary to determine what P12 will start up until time 35. Any lots started after that time will not arrive in the queue for P13 before 40 time steps from now, and need not be considered.

To determine what will happen at P12 until time 35, a local prediction is run which asks P11 what it will be doing up until time 25. Any lots started in P11 after time 25 will not arrive in the queue for P12 in time to be considered. A local prediction is then made for P11. In order for anything in P10 to effect P11 by time 25, lots must already be in process in P10. Assuming this not to be the case, nothing that is decided by P10 can have any effect on P11 before time 25. Thus, it is not necessary to make local predictions beyond P11 in order to completely calculate what will happen at the input queue of P13 up to time 40.

However, assume that P38 uses the same machine as P11, P11 must know what will happen to P38 in order to accurately predict the operation of the machine which is common to both processes. Therefore P38 must also be predicted out to time step 25. This involves predicting P37 out to time step 20, and P36 out to time step 0. If P36 is currently empty, it will have no effect on the decisions made by other machines, and can be ignored.

Now a local prediction is made for process P40 out to time 40. P39 must be predicted out to time 25, which means that P38 must be predicted out to time 15. However, P38 has already been predicted out to time 25, so no additional prediction must be made. Rerunning the local prediction for P38 would be redundant, since the previous calculations were saved. The simulator which runs the local predictions recognizes that P38 was previously involved in an optimization process, and how far the prediction has gone, by checking the OPTIMIZ- ING? and CHECKED-UP-TO data items in the relevant process data structures. (FIG. 2)

Processes P13 and P40 can now make their local optimization decisions based on complete knowledge of what will happen to them within the relevant time frames. This knowledge was obtained by looking at the future of the neighborhood only, with the future of the remainder of the facility being a "don't care" as far as P13 and P40 are concerned.

The local prediction process quickly reached a horizon beyond which it was not necessary to make predictions. This is typical of local predictions, which are made for one machine for a short length of time. Of course, the distance, in time, to the horizon varies with the details of the particular situation. In addition, it is not always necessary to carry out a prediction to the limit of the time horizon. Sometimes a prediction only part way out will indicate that the machine doing the local optimization will receive enough lots to complete a full load, or a series of loads as in the bottleneck example described above. Therefor, the preferred method of making local predictions involves making them out to only a time period less than the maximum, checking to see if the necessary lots will be received, then checking for another increment of time, etc. This incremental approach ensures that a great deal of extra checking is not made if it is unnecessary.

Thus, the local prediction process is a recursive procedure, simple in concept, which eventually terminates when the time horizon of the initiating procedure is reached, or another stopping point is indicated. Many types of control can be exercised over placement of the stopping horizon. In addition to time and receipt of needed lots, such stopping points as scheduler processor time, depth of the recursive search, and number of side branches predicted can be used. This allows a partial prediction to be made in those cases where the computational powers of the scheduler do not allow full local predictions to be made. Also, predictions will typically not be made beyond broken machines, bottlenecks, or machines which are members of time constraints.

Figure 8:
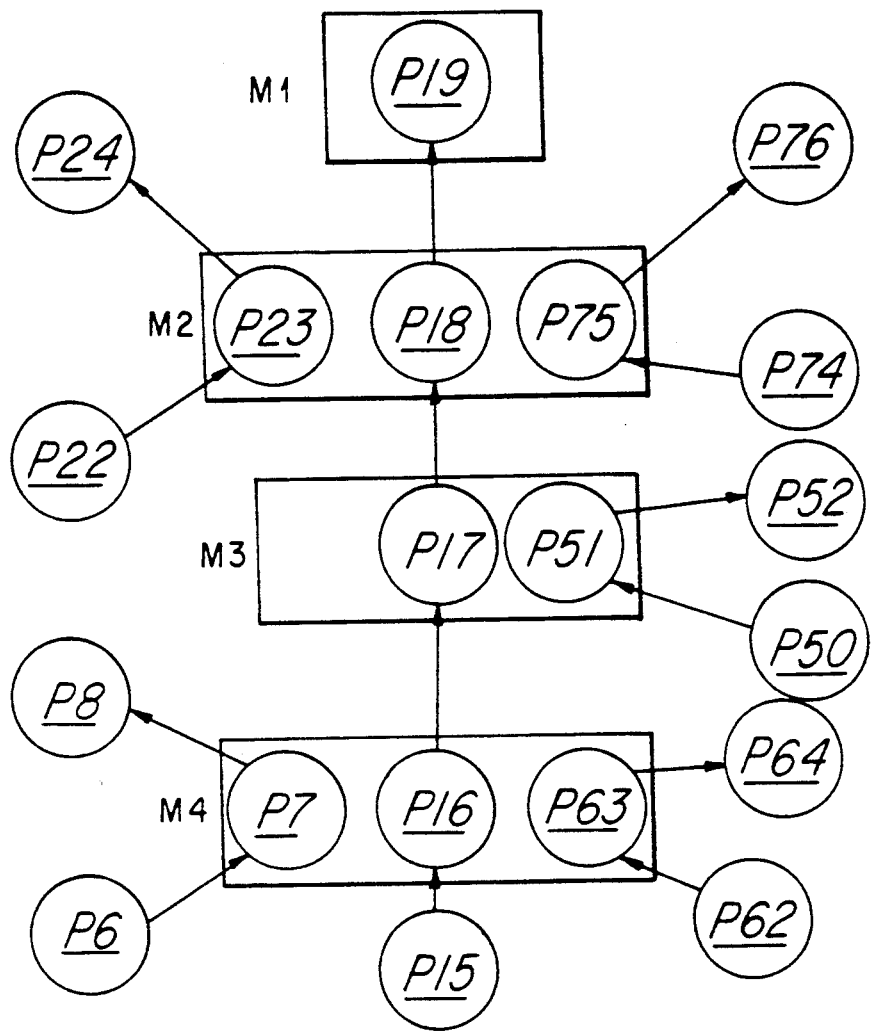
FIG. 8 is an illustration of a portion of a process flow near a large capacity machine.

FIG. 8 illustrates the local prediction process for a multi-lot machine optimization. As described above, such processes have a large impact on the overall cycle time of the facility. For simplicity of description, the long wait process, P19, has only a single machine M1, and M1 does no other processes. The machines shown in FIG. 8 are described in Table 5.

TABLE 5

| Machine | Processes | Process Time | Capacity | Lots in Queue |
|---------|-----------|--------------|----------|---------------|
| M1      | P19       | 60 time steps | 8 lots  | 5             |
| M2      | P18       | 5            | 2        | 1             |
|         | P23       | 5            | 2        | 4             |
|         | P75       | 5            | 2        | 2             |
| M3      | P17       | 10           | 2        | 2             |
|         | P51       | 10           | 2        | 4             |
| M4      | P16       | 15           | 4        | 1             |
|         | P7        | 15           | 4        | 6             |
|         | P63       | 15           | 4        | 4             |

All machines have just unloaded — no work in process.

As shown in the machine data structure, machines such as M1 are selected to use the multi-lot machine optimization decision strategy. This strategy causes the machine to attempt to minimize a function giving the total lot-hours of lots in the queue for M1. A local simulation is made in the same manner as described above in connection with bottleneck machines. The results of this simulation are used to calculate the total lot-time of lots in the queue for M1. The minimum point for this calculation is the time at which M1 should be loaded.

Under the circumstances shown in Table 5, 5 lots are currently waiting in the queue. Thus, for every time step that M1 delays loading, 5 lot-timesteps are added to the queue waiting function. This tends to cause M1 to load as soon as possible. On the other hand, once M1 starts, any lots that arrive within the next 6 hours must wait in the queue. If M1 starts a partial load now, and additional lots arrive within the next 5 time steps, each of those lots must wait an additional 55 time steps in the queue for M1. This tends to cause M1 to wait for a full load. The preferred loading scheme balances these two competing tendencies to minimize the overall queue wait time.

In FIG. 8, it can be supposed that the expected lot arrival times in the queue of M1 are (for current time=0): 1 lot at time step 10, and 2 lots at step 40. Assume for now that no other lots will arrive until at least time step 80. If M1 begins processing 5 lots now, it will unload, and thus be available to receive new lots at time 60. The total queue waiting time is 1 lot * 50+2 lots * 20=90. If M1 waits until time 10 to run 6 lots, the total queue waiting period is 5 lots * 10+2 lots * 30=110. Waiting until a full load is ready gives a total queue wait of 5 lots * 40+1 lot * 30=230. The best selection under this situation is to load a partial load of 5 lots imediately. Different expected arrival times will, of course, yield different results.

A machine using the multi-lot machine optimization decision strategy has the ability to influence upstream processes in a manner similar to the demand signals sent by bottleneck machines. A request signal sent by this machine will cause upstream machines to advance the processing of lots needed for the long wait machine if doing so is convenient. This signal is represented as a loading time for the upstream machines, expressed as an absolute time step value. This value is placed in the data structure for the affected upstream processes.

In the FIG. 8 example, using the machine status shown in Table 5. M1 could place a request signal to M2 to process lots waiting for process 18 first. Assuming there was no conflicting demand from P24 or P76. M2 would load and process the single lot in the P18 queue. Local prediction for M2 would now indicate that another lot will be made available to M1 in 5 time steps. M1 recalculates its queue wait function, and determines that waiting for 1 more lot gives a total wait time of 5 lots * 5+2 lots * 25=75. Since this is less than 90, the previous minimum. waiting for M2 to process one more lot is the preferred solution. If, for some reason. M2 could not do process 18 next, the best choice would be to load M1 now. Such a situation could arise if M2 received conflicting demands, such as a demand signal from a bottleneck machine propagating from P76.

It is possible that lots now waiting for P17 could be pushed so that they would arrive at M1 at time 15. However, this would result in a total queue wait time of at least 5 lots * 15−1 lot * 10=85. Thus, any function which waits for these lots is less desirable than that described in the previous paragraph.

A similar situation arises when a machine which has long setup times for different processes makes a local decision. Long setup times have an effect nearly identical to long process times in that once started, some lots may have to spend a long time in the queue. There is an additional complication, however, in that these machines may have a choice between processing a few lots now and then changing, or changing and letting more lots accumulate in the current queue. However, the minimization function is calculated in the same way. Each machine will decide which process to perform next by determining which choice gives the shortest total queue wait time in order to minimize cycle time. Request signals are sent upstream in the same manner as for slow, high capacity machines.

Another type of control signal sent to upstream processes is a negative request, or lack of demand, signal. This signal is used when a machine is off line for repair or maintenance, and prevents large queues from building up in front of broken machines. Negative request signals also consist of placing a time that lots are needed in the data structure of the next upstream process. In fact, the negative request signal is the same as the normal request signal, except that the time step which is placed in the data structure for the upstream process is later than that for normal requests.

Figure 15:
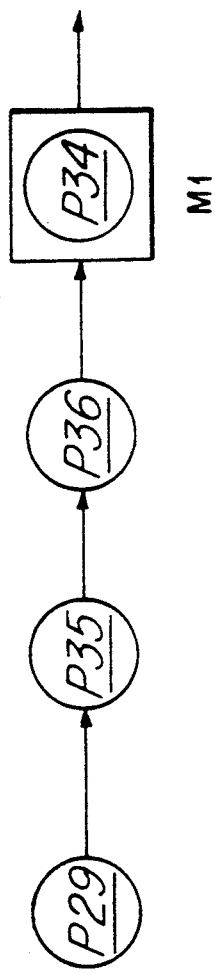
FIG. 15 illustrates a process flow utilizing a negative request signal.

If the machine for a single machine process is down for repair, or all of the machines for a multiple machine process, a negative demand signal is sent to upstream processes. This signal is simply a request that lots be supplied at some time in the future which is great enough to prevent build up of a queue at the broken machine. An example situation is shown in FIG. 15, which shows 3 processes feeding into a broken machine M1, which is the only machine doing process P37. The machines, processes, and current queues are shown in Table 6.

TABLE 6

| Machine/Process | Process Time | Capacity | Current Queue |
|---|---|---|---|
| M1 (P37) | 5 steps | 1 lot | 4 lots |
| P36 | 6 steps | 1 lot | 2 lots |
| P35 | 4 steps | 1 lot | empty |
| P34 | 8 steps | 1 lot | 2 lots |

Process P36 also has 1 lot in process
M1 is expected to be available in 10 time steps Assuming the current time to be time 0, M1 is expected to be available beginning at time step 10. This information may be entered directly by a repairman or other person, or may be calculated from expected average or past statistical behavior for M1.

The queue for M1 will take 20 times steps to process, so that any lots which arrive in the queue for process P37 will spend time in the queue if they arrive before time step 30. Since M1 is down, process P37 will send a negative request signal to P36 in an attempt to prevent any more lots from adding to the queue. A simple routine is used to place the negative request signal in the data structures for the upstream processes. This procedure simply moves upstream using addition and subtraction to determine when processes need to be started in order to arrive at P37 just as M1 becomes available. The procedure continues until the negative request signal reaches current time (0 in this example), or until a special case arises.

Since a lot is currently in process at P36, this lot must be considered with those already in the queue for P37. Thus, if P36 makes no new starts, M1 will not actually become available to process new lots until time step 35. Since P36 has a process time of 6 steps, it should start a lot by time 29. This value is placed into the data structure for process P36. If the lots now in the queue for P36 can be processed and put into the queue for P37 before the queue for P37 becomes empty, the number of lots in the queue for P36 * the process time for P37 is added to 29, giving 39 and the process time for P35 subtracted, giving 35. This is the time until which P35 is requested to wait before starting a lot. The queue wait time for P35 is 0, so the process time for P34 is subtracted from 35, giving 27 to be placed in the data structure for process P34. This procedure continues until the value propagating upstream reaches 0. For current times other than 0, the signal propagates until it matches the current time.

There are several special situations which cause the negative request signal to cease upstream propagation even before it reaches the current time. One of these occurs when the signal propagates upstream until it reaches a process which uses the same machines as the one that is broken. It makes no sense for the negative request signal to be propagated past its origination point, as another signal will be propagated from that point for the earlier group of processes anyway. The signal is also preferably not propagated upstream behind machines which use the bottleneck decision strategy, or long wait machines, which use the multi-lot machine optimization strategy. These machines have a large impact on the overall plant capacity and cycle time, and it is preferred that a broken machine not affect their normal operations.

The effect of the negative request signal can vary depending on the particular implementation. Preferably, it is simply a request, and does not absolutely control operation of the upstream process. This means that an upstream process would cause the machines in the process to work on other processes if lots are available to do so, but the upstream processes would still continue to process available lots if their machines had nothing else to do. Thus, there is not an enforced idleness of the upstream processes. Another approach is to actually enforce idleness of the upstream processes until the current time catches up with the negative request signal.

Preferably, the negative request signal is only used for situations in which all machines available to a process are down for repair or maintenance. In some manufacturing facilities, it may be desirable to use a negative demand signal in other unusual circumstances. These could include any process which builds up a queue larger than some desired amount, or could be used when a near term plant shutdown is expected, and it is not desirable that certain machines have a queue during shutdown. In the latter case, the negative request will usually be a controlling signal.

The decision making process for a machine in a safetime constraint is relatively simple. All machines in a constraint will be controlled by the slowest process in the constraint. In order for any process in a constraint to make local predictions within the constraint, it is necessary only to look to the constraint starter to determine when lots will start. The constraint starter starts lots only at a rate which the slowest member can handle, as set forth in the constraint data structure. Determining the locations of lots after they are started in the constraint is straigtforward. The details of constraints are extrremely domain specific, and certain prediction rules may need to be modified depending on the nature of the problem.

Machines which process multiple lots, including bottleneck and multi-lot machines as described above, will sometimes make a decision to wait and load at a later time. This decision is based on the local prediction made for that machine, which prediction included certain assumptions about the operation and availability of upstream processes. If one of the machines for one of the upstream process should break down, or come back on line after a repair, those assumptions may no longer be valid, and the decision should be reconsidered. As an extreme example, if the machine immediately upstream from a machine which is waiting to load should break down, none of the lots for which the multi-lot machine is waiting will arrive as scheduled. The multi-lot machine should therefor undertake anew the local optimization process, including a new local prediction based on the new machine breakage information. If the new decision is to load now, the time which the lots would have spent waiting in the queue has been removed. This process can be referred to as truth maintenance.

Thus, whenever a machine breaks down, any machine which has made a decision to hold loading based on a local prediction which includes the newly broken machine should redo its local optimization. The same holds true for any machine which made a decision based on some machine being down for repair which has now returned to service. The easiest way to handle this case is to, whenever some machine decides to delay loading, place pointers to that machine in the data structures for every machine which was involved in the local prediction leading to that decision. Then, if any of these machines should change status, the scheduler can easily determine which machines should recalculate their local optimization. Note that machines involved in a local optimization wherein the decision is to load immediately need not keep such pointers.

CALENDAR MECHANISM

In order to implement the scheduler system efficiently, it is necessary to have an efficient calendar mechanism. The calendar must provide a place to store information on upcoming events, and to indicate events which are to take place in the current time step.

A calendar suitable for use with the scheduler described above must have several properties which are somewhat conflicting. It must be relatively small and fast for efficiency, since it will be consulted often. It must also be able to store information extending far into the future. For example, two years into the future is probably a minimum for manufacturing processes in order to take into account known preventive maintenance downtime. For time steps of six minutes, this requires a minimum of approximately 175,000 time steps. Also, the calendar must be able to have new events inserted at any time in the future. New events will be generated constantly by current events, such as the loading of a machine generating the future event of the expected unloading time.

A calendar which has separate slots for each time step out to some time in the future would be very large. A calendar mechanism is now presented which is fairly small, fast and flexible.

Figure 16:
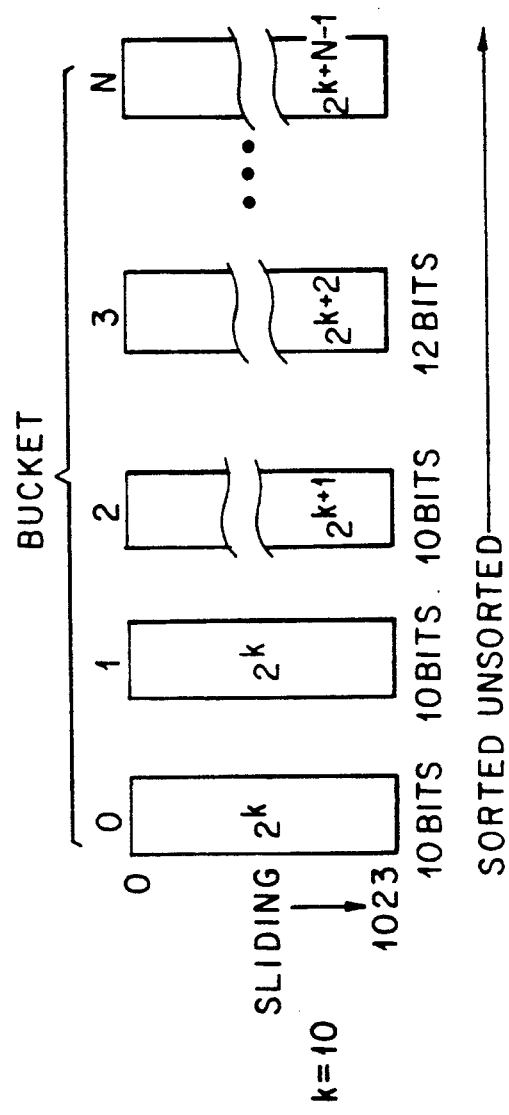
FIG. 16 illustrates a preferred calendar mechanism.

The future is divided into buckets of time steps. The first two buckets cover the same time period, and later buckets are larger. Referring to FIG. 16, buckets 0 through N are shown. The size of the buckets increases by powers of 2, except for the first two (0.1) which are the same size. The size of the buckets may be chosen as desired, and is 1K (1024) time steps in the preferred embodiment for the first two buckets. Buckets 2 is therefor 2K time slots in size, while Buckets 3 through N are each twice the size of the preceding bucket.

The size of a bucket refers to the number of time steps which are calendared within that bucket. This indicates only the potential number of events which can be contained within the bucket. If no events are currently scheduled for the time span covered by the bucket, the bucket will be empty. When a new event is scheduled, the appropriate bucket is determined, and a notice of the scheduled event is placed into that bucket.

It is seen that one property of dividing future time steps into buckets as described above is that, starting with bucket 2, the number of time steps contained within each bucket is equal to the number of time steps contained within all preceding buckets. This property will be used to operate the calendar efficiently.

In order to minimize the amount of sorting which takes place, only bucket 0 is sorted. The remaining buckets contain notices of scheduled events in random order. When a new event is scheduled during the time period covered by, for example, bucket 2, the new notice of the event is merely added to the end of the list of events currently held in bucket 2.

Bucket 0 is a sliding bucket, in that it moves to include the current time step plus the next 1023 time steps. Therefor, as time progresses, the time steps at the end of bucket 0 overlap with those of bucket 1. This does not cause any problems. Any newly scheduled events which are within 1023 time steps of the current one are placed into bucket 0 at the appropriate position. Thus, bucket 0 always contains events which are scheduled within the next 1023 time steps, and these events are sorted.

When the current time reaches 1024, which is the beginning of bucket 1, all of the events in Bucket 1 are sorted and merged with bucket 0. Bucket 0 continues to progress with time until time step 2047, overlapping with bucket 2 in the same manner as just described. When the current time reaches time step 2048, the contents of bucket 2 are put into buckets 0 and 1. The events associated with the next 1024 time steps are sorted and merged into bucket 0, with those remaining simply put into bucket 1. At this point, the latest time step associated with bucket 1 and with bucket 2 is the same, so that bucket 2 is not used. The calendar is referenced as described above until 2048 more time steps have passed.

At time step 4095, the end of bucket 1 has again been reached. Bucket 0 contains newly calendared events for the next 1024 time steps, as before. Bucket 3 is the next bucket to use, so the contents of bucket 3 are split into 2 groups. Those events which take place during the last half of the time period covered by bucket 3 are placed into bucket 2, and those which occur during the first half are split between buckets 0 and 1, with those going into bucket 0 being sorted and merged with the events currently contained there. The calendar then continues to be referenced as described above.

In general, whenever the time period represented by the end of a particular bucket is reached, the events contained in the next bucket are distributed among the preceeding buckets according to the time span covered by such preceding buckets. Each bucket covers a time span which is twice that of the preceding bucket, so that the time span covered by any particular bucket will always exactly span the sum of the time periods of all preceding buckets.

Only bucket 0 actually orders the scheduled events according to the time step in which they occur. The remaining buckets consist of only a list of those events which occur in the time period covered by that bucket. Thus, large buckets do not necessarily take up more storage space than smaller buckets; the size of a bucket, except for bucket 0, depends only on the number of events scheduled to occur in the relevant time frame. In factory scheduling systems, and most other scheduling situations, most of the currently scheduled events will occur in the near future. For example, many events will occur within the next 20-50 time steps, such as machine loads and unloads, etc. Very few events are scheduled to happen at a specific time a year in advance, and these are typically annual maintenance shutdowns, annual plant shutdowns for vacation, etc. Thus bucket 7, which covers a time span of 65,536 time steps, begins approximately 273 days after the start time of the calendar. Very few events will be scheduled that far in advance, so that bucket 7 will be relatively small.

In order to implement the above described calendar mechanism efficiently in a computer, several preferred data structures are used. All buckets except bucket 0 consist of linked lists of events. Each event has an description identifying what is to occur, a time, and a pointer to the next event in the list. The time is a binary absolute number dating from the beginning of the use of the calendar. If 24 bit numbers are used, 16 million time steps can be calendared, which is equal to approximately 190 years. Larger binary numbers can be used if longer time periods are desired.

When events are assigned to particular buckets, the decision as to which bucket should contain a particular event can be easily made by manipulating the time bits for the event. Initially, 10 bits are used for buckets 0 and 1. For those events which have time less than 1024, the time indicates the slot within bucket 0 to which that event should be assigned. Bucket 3 will contain events having 12 bit times. When bucket 3 is distributed between buckets 0-2, those events having times with a most significant bit of 1 (the larger numbers) are assigned to the next lower bucket, in this case bucket 2. The next most significant bit is used to determine whether the remaining events are assigned to bucket 0 or 1. Those events assigned to bucket 0 are placed into a time slot according to their 10 least significant bits. Events in all other buckets are simply kept in a linked list.

Distribution of larger buckets is done in the same manner, always using the most significant bit for that bucket to determine whether an event is to be placed in the first preceeding bucket (MSB is 1), or in some earlier bucket (MSB is 0). Note that the MSB used for this decision is actually the MSB of the number representing the size of the bucket. For example, all time periods above 8M will have a MSB of 1 (assuming 24 bit times) but distribution of bits from bucket 3 is always made based on bit 12.

Assignment of newly scheduled events in bucket 0 is equally simple. If a new event is less that 1024 time steps later than the current time, that event is simply placed in bucket 0 at the position indicated by its 10 LSB. This is effectively a modulo 2**10 operation. A current time pointer into bucket 0 constantly circulates through the 1023 positions therein; when the pointer reaches 1024, it goes next to the 0 position in bucket 0.

Since bit manipulation is a very efficient operation on digital computers, the decisions outlined above are done very quickly. It should also be noted that no sorting in the traditional sense is ever done. Events are simply copied from one place to another based on the values of 1 or more bits. Actual times for two events are not actually compared.

Each time slot in bucket 0 is actually a pointer to a list of events which are to occur at that time. This pointer is nil if no events are scheduled for a particular time. The list of events which occur at a particular time is preferably a simple single linked list.

Although a calendar system using powers of 2 has been described, it is easy to use other bases. For example, a calendar can utilize powers of 10, which begins with 10 equal sized buckets, followed by 9 buckets each 10 times as large as the first, etc. Variations on this arrangement will become apparent to those skilled in the art.

MODIFICATIONS AND VARIATIONS

The scheduler described above has been detailed with reference to a scheduling system for a semiconductor front-end manufacturing facility which produces basically one product. However, slight changes allow the scheduler to be used in a wide variety of situations.

If several major product process flows exist in a facility, an additional factor must be taken into consideration. This is that the relative product mix may vary over time. For example, if three products are normally fabricated in equal amounts, and it is then desired to drop one product completely, the global analysis for the factory will be incorrect. It then becomes necessary to recalculate the global parameters so that the factory can operate most efficiently.

If a change in product balance is relatively permanent, it is desirable to recalculate the entire global description of the facility. If the change is a relatively short fluctuation, such a total recalculation is not necessary. A relatively short fluctuation could be defined as one which is less than the average cycle time for products in the facility, although particular situations may require special consideration. A two day fluctuation, perhaps due to raw material supplies, in a facility having an average cycle time of 3 weeks will not have a large enough impact to justify a complete global recalculation.

However, some efficiency can be gained by recalculating the global parameters for the critical machines; that is, the bottleneck and long queue wait machines. By changing the machine profiles for these machines temporarily, until the fluctuation is over; overall operation of the plant can be kept reasonably efficient. Note that it is simple to effect the changes; the global recalculations can be done as the time and resources become available, and the results can simply be used to change the machine profiles of the affected machines. Those machines will immediately begin operating under the new goals without disrupting the overall flow of products through the plant.

If multiple products are manufactured in a facility, especially if some of them are promised to be available by certain dates, a few minor changes may be made in the local optimization process. Every lot can carry a due date within its data structure, and this date will be given consideration when that lot is involved in a local optimization. Thus, priority will be given to lots having a close due date. Some lots may be special rush jobs, and have a very close due date. These will generally be moved through the system very quickly. However, it is important to note that the general system is unchanged; due dates on certain lots is simply another factor to be considered by the local decision making process during local optimization.

The principles described for the scheduler can also be easily adapted to design a simulator for a factory system. The simulator simply uses the calendar to step through times steps. For each time step, the status of any machines, lots or process which changes is updated. When the simulator indicates that a local decision is to be made, the same decision as described above is made, using the status of the neighborhood as held in the simulator instead of in the actual factory floor. Since a simulacrum of the factory is inherently contained within the scheduler, it is only necessary for the simulator to ba able to access that information, and update it. The simulator primarily consists of display and operator interaction tools, and random number generators to determine occurances of machine breakages and repairs. The random numbers are modified by the MTBF and MTTR numbers for each machine.

A system for scheduling a semiconductor front end has been implemented consistent with the above description. It is written in Common LISP, and runs on an EXPLORER symbolic computer from Texas Instruments. A detailed simulation of a complete front end has been run, and the scheduler has proven capable of scheduling the factory at a speed greater than 1000 times faster than real time. This allows an entire month of scheduling, and simulation of plant operation, to be run in less than one hour.

TECHNICAL ADVANTAGES

The improved scheduler allows scheduling decisions to be made in real time, or faster. The important parts of the problem are highlighted in the global analysis. The global goals of the facility are abstracted into a set of information, the machine profile, which allows local decision to be made which are consistant with and support the global strategies which are desired. Local decisions can be made accurately through the use of local prediction, which allows each machine to make loading decisions based on the short term future events in its neighborhood as well as the global goals. Since the scheduler and simulator are relatively fast, changes in strategy can be modelled to determine their probable effect on overall plant operation. The scheduling system is very flexible, and can easily be adapted to most classes of automated scheduling, including manufacturing, shipping, and other fields which require planning of future events.

The embodiment described above illustrates the invention, but it will be appreciated that modifications, variations and substitutions will become apparent to those skilled in the art. The above description does not define the limits of the invention, which has a scope defined by the claims.

What is claimed is:

1. A method to be performed by a machine for calendaring a plurality of events which are to occur on a plurality of machines at various times to thereby control operation of and improve scheduling of said plurality of machines, comprising the steps of:
   (a) dividing future time spans into a plurality of segments of unequal length, wherein later segments are predetermined multiples of the length of the first segment;
   (b) placing events to occur on any of the said plurality of machines in appropriate buckets representative of the time segments;
   (c) incrementing a clock, wherein each of said events are removed from the first bucket when the clock reaches their calendared time; and
   (d) dividing the events contained in larger buckets among appropriate smaller buckets when previous buckets have been emptied, and resetting the time represented by the first bucket to the current time.

2. The method for calendaring a plurality of events of claim 1, wherein said first bucket is a sliding bucket.

3. The method for calendaring a plurality of events of claim 1, wherein only said first bucket is sorted.

4. The method for calendaring a plurality of events of claim 1, wherein said events in all buckets other than said first bucket are linked lists of events.

5. The method for calendaring a plurality of events of claim 4, wherein each of said events has a description identifying what is to occur, a time, and a pointer to the next event in the list.

6. The method for calendaring a plurality of events of claim 4, wherein said linked lists are simple single linked lists.

7. The method for calendaring a plurality of events of claim 1, wherein said second bucket covers a segment of future time span equal to said first bucket, and each other said bucket covers a segment of future time spans which is twice that of an immediately preceding bucket, so that said segment covered by any particular bucket will always exactly span the sum of the segments of all preceding buckets.

8. A calendar mechanism for a scheduler system controlling the operation of a plurality of machines, comprising:

- a timing means which is adapted to be incremented by the system;
- a means for dividing future time spans into a plurality of segments of unequal length, assigning each of a plurality of buckets to correspond to each of the plurality of segments, wherein later segments are predetermined multiples of the length of the first segment;
- a means for receiving inputted events from the system and placing said inputted events in appropriate buckets representative of the time segments received from said segmenter;
- a means for removing events from a first bucket when the incremented clock reaches their calendared time and outputting such event to the system for appropriate response by the machine; and
- a controlling means for dividing the events contained in later buckets among appropriate earlier buckets when previous buckets have been emptied, and resetting the time represented by the first bucket to the current time.

9. The calendar mechanism for a scheduler system of claim 8, wherein said first bucket is a sliding bucket.

10. The calendar mechanism for a scheduler system of claim 8, wherein only said first bucket is sorted.

11. The calendar mechanism for a scheduler system of claim 8, wherein said events in all buckets other than said first bucket are linked lists of events.

12. The calendar mechanism for a scheduler system of claim 11, wherein each of said events has a description identifying what is to occur, a time, and a pointer to the next event in the list.

13. The calendar mechanism for a scheduler system of claim 11, wherein said linked lists are simple single linked lists.

14. The calendar mechanism for a scheduler system of claim 8, wherein a second bucket covers a segment of future time span equal to said first bucket, and each other of said plurality of buckets cover a segment of future time spans which is twice that of an immediately preceding bucket, so that said segment covered by an particular bucket will always exactly span the sum of the segments of all preceding buckets.

* * * * *